(12) United States Patent
Hoang et al.

(10) Patent No.: US 9,477,312 B2
(45) Date of Patent: Oct. 25, 2016

(54) DISTANCE BASED MODELLING AND MANIPULATION METHODS FOR AUGMENTED REALITY SYSTEMS USING ULTRASONIC GLOVES

(71) Applicant: UNIVERSITY OF SOUTH AUSTRALIA, Adelaide, South Australia (AU)

(72) Inventors: Thuong N. Hoang, Adelaide (AU); Bruce Hunter Thomas, Adelaide (AU); Ross Travers Smith, Highbury (AU)

(73) Assignee: University of South Australia, Adelaide (AU)

( * ) Notice: Subject to any disclaimer, the term of this patent is extended or adjusted under 35 U.S.C. 154(b) by 364 days.

(21) Appl. No.: 13/964,828

(22) Filed: Aug. 12, 2013

(65) Prior Publication Data

US 2014/0125577 A1    May 8, 2014

(30) Foreign Application Priority Data

Nov. 5, 2012  (AU) ................................ 2012904867

(51) Int. Cl.
*G06F 3/01*       (2006.01)
*G06F 3/0481*   (2013.01)

(52) U.S. Cl.
CPC ............... *G06F 3/017* (2013.01); *G06F 3/014* (2013.01); *G06F 3/04815* (2013.01)

(58) Field of Classification Search
CPC ..... G06F 3/017; G06F 3/014; G06F 3/04815
See application file for complete search history.

(56) References Cited

U.S. PATENT DOCUMENTS

| | | | | |
|---|---|---|---|---|
| 4,988,981 A | * | 1/1991 | Zimmerman | ......... A61B 5/1114 345/156 |
| 2004/0032346 A1 | * | 2/2004 | Kim | ........................ G06F 3/014 341/20 |

(Continued)

OTHER PUBLICATIONS

"Blind Assistive Technology (BAT) Sleeve," Frinky Labs, 2013, [retrieved on Jul. 30, 2013], 7 pages. Retrieved from: www.frinkylabs.com/p/blind-assistive-technology-bat-sleeve.html.

(Continued)

*Primary Examiner* — Kathy Wang-Hurst
*Assistant Examiner* — Joseph Fox
(74) *Attorney, Agent, or Firm* — Sheridan Ross P.C.

(57) ABSTRACT

User input gloves and input methods are described that are well suited to provide input to computer modeling (eg CAD) and augmented reality (AR) systems, including wearable AR and spatial AR. Each glove comprises palm mounted ultrasonic transducers, accelerometers, finger based pinch inputs and a wireless communication module. The gloves can be used to measure distances over the natural range of distances that hands can be placed, as well as their orientation, with sufficient resolution to facilitate a range of gesture based input methods to be developed and utilized, including distance-based modeling by measurement. Further the gloves are light weight, allow fast input of modeling measurements, are easy to use, and reduce fatigue compared to existing glove based input systems. The user input gloves, and associated input techniques can be used to measure small and body sized objects using one or two hands, and large objects can be measured using single handed measurements. Further models for both small and large objects can be generated and manipulated through the use of a numeric input technique to obtain an amplification factor to magnify the effective distances measured.

50 Claims, 5 Drawing Sheets

(56) References Cited

U.S. PATENT DOCUMENTS

| | | | | |
|---|---|---|---|---|
| 2005/0151722 | A1* | 7/2005 | Meteyer | G06F 3/1014 345/158 |
| 2010/0103075 | A1* | 4/2010 | Kalaboukis | A63F 13/02 345/8 |
| 2010/0202656 | A1 | 8/2010 | Ramakrishnan et al. | |
| 2012/0119987 | A1* | 5/2012 | Im | G06F 3/017 345/156 |
| 2012/0139689 | A1* | 6/2012 | Nakade | G08C 17/02 340/4.3 |
| 2013/0100169 | A1* | 4/2013 | Liao | G06F 3/014 345/660 |

OTHER PUBLICATIONS

Bastien et al., "Interactive Modelling for AR Applications," 9th IEEE International Symposium on Mixed and Augmented Reality, 2010, pp. 199-205.

Bowman et al., "Using Pinch Gloves™ for both Natural and Abstract Interaction Techniques in Virtual Environments," 2001, 5 pages.

Duff et al., "Autocalibration Algorithm for Ultrasonic Location Systems," Proceedings of the Seventh IEEE International Symposium on Wearable Computers, 2003, pp. 62-68.

Fléty, "3D Gesture Acquisition Using Ultrasonic Sensors," Trends in Gestural Control of Music, 2000, pp. 193-208.

Foxlin et al., "WearTrack: A Self-Referenced Head and Hand Tracker for Wearable Computers and Portable VR," Proceedings of International Symposium on Wearable Computers, 2000, 8 pages.

Kalgaonkar et al., "One-Handed Gesture Recognition Using Ultrasonic Doppler Sonar," Proceedings of the IEEE International Conference on Acoustics, Speech, and Signal Processing, 2009, pp. 1889-1892.

Lee et al., "HandSCAPE: A Vectorizing Tape Measure for On-Site Measuring Applications," Proceedings of the ACM CHI 2000 Human Factors in Computing Systems Conference, 2000, pp. 137-144.

Ogris et al., "Using Ultrasonic Hand Tracking to Augment Motion Analysis Based Recognition of Manipulative Gestures," Proceedings of the 2005 Ninth IEEE International Symposium on Wearable Computers, 2005, pp. 152-159.

Piekarski et al., "Augmented Reality Working Planes: A Foundation for Action and Construction at a Distance," Proceedings of the Third IEEE and ACM International Symposium on Mixed and Augmented Reality, 2004, pp. 162-171.

Piekarski et al., "Interactive Augmented Reality Techniques for Construction at a Distance of 3D Geometry," Immersive Projection Technology / Eurographics Virtual Environments Conference, 2003, 10 pages.

Reitmayr et al., "Going out: Robust Model-based Tracking for Outdoor Augmented Reality," 2006, 10 pages.

Rosenberg et al., "The Chording Glove: A Glove-Based Text Input Device," IEEE Transactions on Systems, Man, and Cybernetics-Part C: Applications and Reviews, 1999, vol. 29, No. 2, pp. 186-191.

Sturman et al., "A Survey of Glove-based Input," IEEE Computer Graphics and Applications, 1994, vol. 14, Iss. 1, pp. 30-39.

Thomas et al., "Glove Based User Interaction Techniques for Augmented Reality in an Outdoor Environment," Virtual Reality, 2002, vol. 6, Iss. 3, pp. 167-180.

Wither et al., "Fast Annotation and Modeling with a Single-Point Laser Range Finder," Proceedings of the 7th IEEE International Symposium on Mixed and Augmented Reality, 2008, pp. 65-68.

* cited by examiner

DISTANCE BASED MODELLING AND MANIPULATION METHODS FOR AUGMENTED REALITY SYSTEMS USING ULTRASONIC GLOVES

PRIORITY DOCUMENTS

The present application claims priority from Australian Provisional Patent Application No. 2012904867 titled "DISTANCE BASED MODELLING AND MANIPULATION METHODS FOR AUGMENTED REALITY SYSTEMS USING ULTRASONIC GLOVES" and filed on 5 Nov. 2012, the entire content of which is hereby incorporated by reference.

TECHNICAL FIELD

The present application relates to augmented reality systems, and in a particular form, relates to input devices and methods for augmented reality systems.

BACKGROUND

Models play an important role in augmented reality (AR) systems to improve the AR experience. Virtual models are used to support algorithms that provide improved occlusion effects, more accurate registration, and improved augmentation of corresponding physical objects. Even with the large body of research exploring modeling techniques for AR systems, the majority of models used by AR systems are created using traditional desktop Computer Aided Design (CAD) systems. AR users are constrained to the role of a consumer of the models with limited capability for creating and modifying them. Two major techniques for virtual objects manipulations have been investigated, namely computer vision and direct manipulation.

Action at a distance is the problem of interacting with virtual objects that are out of arm's reach. One example is the AR working planes technique by Piekarski and Thomas (W. Piekarski and B. H. Thomas, "Augmented reality working planes: a foundation for action and construction at a distance," *ISMAR* 2004, pp. 162-171, 2004) to create polygonal models of outdoor buildings using wearable computers. The technique defines an outline model of a building by intersecting a collection of planes, which are created by the user sighting along the surfaces of the building to be modeled. Bastian et al. (J. Bastian, B. Ward, R. Hill, A. van den Hengel, and A. Dick, "Interactive modeling for AR applications," in *ISMAR* 2010, pp. 199-205) developed a modeling approach using segmentation algorithm from computer vision. The 3D shape of the object is reconstructed based on the silhouette of the object from various angles, which has been segmented from the background. Computer vision techniques cannot model purely virtual objects, i.e. there is a requirement of a physical object to model against. AR modeling techniques, however, are still facing the challenge of precision, which is an established advantage of traditional CAD programs.

A major challenge for AR systems, especially for use outdoors, is the development of intuitive input devices. The traditional keyboard and mouse are not suitable due to the mobile nature of the outdoor AR system. Immense research effort in the area of input devices has produced a range of devices in various form factors, with different types of sensors used for a diverse set of techniques. One form of input device that has been investigated is glove-based input devices for their support of natural, intuitive, and hands-free interaction. There are two main forms of sensing for gloves. Firstly there are pinch gloves that sense when the tips of the fingers come in contact with the thumb, i.e. a pinch gesture. The second form is a data glove that senses the joint angles of one or more of the user's fingers.

Historically, data gloves have been used in AR/VR systems for direct manipulation tasks. For example, when a user reaches out and grasps a virtual cup, the system senses the shape of the user's hand to determine the user's action. In one system the joints of the user's index finger were tracked via a computer vision system which sensed strategically placed ring- and ball-shaped retroreflective markers on the user's hand. The positional data of the joints was combined with the kinetic models of the joints to allow gesture tracking of the finger to perform picking gesture on virtual objects. Another vision-based approach used hand tracking of a pair of custom-patterned gloves. The camera interpolates the current hand pose from the unique pattern detected from the captured frame.

Pinch glove input devices incorporate conductive fabric pads on the tips of each finger and thumbs into a pair of gloves. One example of a pinch glove sensor is the chording glove. This glove is a text input device for wearable systems that mounts sensors on the fingers and various positions on the hand. The user presses on a combination of sensors to generate characters based on a chording keymap. Another system that used pinch gloves is the Tinmith wearable AR system (W. Piekarski and B. H. Thomas, "Interactive Augmented Reality Techniques for Construction at a Distance of 3D Geometry," *7th Int'l Workshop on Immersive Projection Technology/9th Eurographics Workshop on Virtual Environments*, 2003). The Tinmith system uses a pair of pinch gloves with fiducial markers on the thumbs for cursor-based manipulation techniques. Pinching input events are mapped to a set of menu items to control the system, placed on the left and right bottom corners of the screen. The pinch gloves are connected to the AR system via Bluetooth. The head mounted camera detects the markers to control two cursors on the user's viewport.

However most of the glove based input devices require either position tracking of the hand which can be computationally challenging, or require unnatural and fatiguing movements. For example in the Tinmith system described above, users experienced fatigue and discomfort associated with holding the thumb markers up at an unnatural pose for extended periods of time. Secondly the range of the cursor movements was also limited by the available screen space, which affected the precision of the manipulation.

There is thus a need to provide improved user input devices and input methods for wearable augmented reality systems, or to at least provide a useful alternative to existing systems.

SUMMARY

According to a first aspect, there is provided a user input glove comprising:

a distance ranging sensor configured to measure the distance to an object from the glove in a direction normal to the palm of the glove;

an orientation sensor for measuring the orientation of the glove;

an input event generator comprising a thumb pad portion and one or more finger contact portions, wherein contact of the thumb pad portion to one of the finger contact portions generates an input event; and a communications module for transmitting one or more range measurements, orientation measurements, or input events.

In a further aspect, the distance ranging sensor measures distances in the range between 2 cm and 3 m to an accuracy of less than 1 cm. In a further aspect the ranging sensor is one or more ultrasonic transducers. In one aspect the one or more ultrasonic transducers are a pair of ultrasonic transducers. In a further aspect the orientation sensor measurements are processed to determine the orientation of the glove in a direction along an axis of a predefined coordinate system comprising three orthogonal axes, wherein a first and a second axis define a ground plane and a third axis is normal to the ground plane. In a further aspect the orientation sensor is a three axis accelerometer. In a further aspect the distance ranging sensor is located in the palm of the glove and the orientation sensor is located on the back of the hand. In a further aspect the one or more finger contact portions comprise a contact portion at the base of the index finger adjacent the thumb. In a further aspect the thumb pad portion and the one or more finger contact portions are patches of conductive fabric, and contact of the thumb pad portion to one of the finger contact portions completes an electrical circuit which is detected by a monitoring circuit to generate an input event. In a further aspect the input event generator measures the duration of a contact event. In a further aspect the communications module comprises a wireless communications module.

According to a second aspect, there is provided a method for providing input in an augmented reality (AR) system comprising at least one user input glove comprising a distance ranging sensor, an orientation sensor, and an input event generator, and a display apparatus, the method comprising:

generating a virtual model of an object using at least one orientation of the user input glove determined from one or more orientation sensor measurements and at least one distance of an object from the user input glove measured using the distance ranging sensor; and displaying a representation of the virtual model.

In this context generating a virtual model comprises generating either a new virtual model, or updating an existing virtual model based upon input from the user input gloves. In a further aspect the AR system is a wearable AR system further comprising a head mounted camera, and wherein the display apparatus is a head mounted visual display unit. In this embodiment the step of displaying a representation of the virtual model comprises displaying an augmented image from the camera in the head mounted display wherein the augmented image comprises a representation of the virtual model. In a further aspect the AR system is a spatial AR system in which the display apparatus is one or more projectors and the step of displaying a representation of the virtual model comprises projecting one or more representations of the virtual model onto one or more surfaces.

In a further aspect the input event generator comprises a thumb pad portion and a contact portion at the base of the adjacent index finger, and measurement of either an orientation from the orientation sensor or a distance from the distance ranging sensor is performed in response to the user generating an input event by contacting the thumb pad portion to the contact portion.

In a further aspect the step of generating a model comprises constructing a virtual model of a physical object by determining a length, width and height of the physical object. The dimensions are determined by selecting one of a length, width or height dimension by measuring the orientation of the user input glove; determining the magnitude of the selected dimension by measuring the distance of an object from the user input glove; and repeating the previous two steps until distance measurements are obtained for length, width and height dimensions. In a further aspect wherein the step of generating a model further comprises the step of measuring the curvature of physical object. This step comprises taking a plurality of measurements along a straight line which is parallel to a chord of the physical object, wherein each of the plurality of measurements is a measurement of the distance of the physical object from the user input glove; and estimating the curvature of the physical object using the change in the measured distance between the plurality of measurements. In a further aspect the step of generating a model comprises manipulating a virtual object by performing an affine transformation. The at least one glove comprises a pair of gloves and one of the gloves is a dominant glove and the other glove is the non-dominant glove. The type of affine transformations comprises a relative scaling operation, a fixed scaling operation, a relative translation operation, a fixed translation operation, or a rotation operation. The method may be embodied as processor readable instructions.

According to a third aspect, there is provided a method for obtaining numeric input in an augmented reality (AR) system comprising at least one user input glove comprising a distance ranging sensor, an orientation sensor, and an input event generator, and a display apparatus, the method comprising:

defining a lower threshold height and an upper threshold height to define a height range;

measuring the height relative to the ground of the at least one glove;

determining a numeric value between a first value and a second value, wherein a numeric range from the first value to the second value is mapped to the height range from the lower threshold height to the upper threshold height, and a measured height is mapped to the corresponding numeric value in the numeric range; and displaying the numeric value.

In a further aspect the AR system is a wearable AR system comprising head mounted camera and the display apparatus is a head mounted visual display unit for displaying an augmented image from the camera, the augmented image comprising the numeric value. In a further aspect the method is used to provide a numeric value in the range 0 to 9 by dividing the height range into equal height intervals, such that a height measurement in a height interval is assigned a value corresponding to the interval number. In a further aspect a pair of user input gloves is used wherein the measuring step comprises measuring the height relative to the ground of each glove and the step of determining a numeric value comprises determining a first numeric value between 0 and 9 from the measured height of the dominant hand, and determining a second numeric value between 0 and 9 from the measured height of the non-dominant hand, and determining a numeric value in the range. The two values are combined to obtain a numeric value in the range 0-99. The numeric values may be used as amplification or scaling factors when generating object dimensions or performing affine transformations. The method may be embodied as processor readable instructions.

According to a fourth aspect, a computing system comprising:
  at least one user input glove according to the first aspect;
  a display apparatus; and
  a processor and a memory.

In a further aspect, the computing system is an augmented reality (AR) system and the processor is configured to generate a virtual model of an object using input from the at least one user input glove, and the display apparatus is configured to display a representation of the virtual model. The at least one user input glove may be a pair of user input gloves. In one aspect the AR system is a wearable AR system and the display apparatus is a head mounted camera and visual display unit for displaying an augmented image from the camera. In one aspect the AR system is a spatial AR system and the display apparatus is one or more projectors for projecting one or more representations of the virtual model onto one or more surfaces. The computing system may be configured to perform the method of the second and third aspects, using input provided by the user input glove.

BRIEF DESCRIPTION OF DRAWINGS

An embodiment of the present invention will be discussed with reference to the accompanying drawings wherein.

In the following description, like reference characters designate like or corresponding parts throughout the figures.

DESCRIPTION OF EMBODIMENTS

Figure 1:
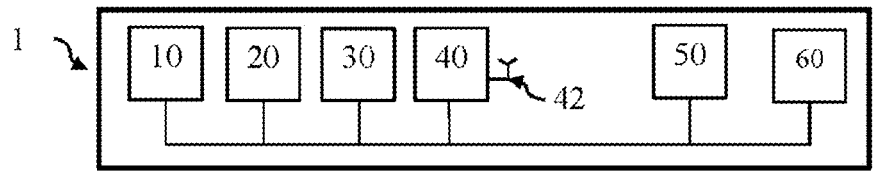
FIG. 1 is a is a block diagram of a user input glove according to an embodiment.

A user input glove that enables a range of input methods for an AR system has been developed. This includes wearable AR systems in which the user wears a head mounted camera and head mounted visual display unit which is used to display an augmented image taken from the camera, as well as spatial AR (or SAR) systems in which projectors are used to augment physical objects with computer generated information and graphics, and other AR systems. One or a pair of user input gloves could also be used as an input device for general computing devices in which the display device can display a representation of a model developed (both fixed systems such as desktop computers, and portable systems such as laptops or tablets). FIG. 1 is a block diagram of a user input glove 1 that comprises a distance ranging sensor 10, an orientation sensor 20, an input event generator 30 and a communications module 40. The communications module may comprise an antenna 42 for wireless communications. In one embodiment the distance ranging sensor is configured to measure the distance to an object from the glove in a direction normal to the palm of the glove, the orientation sensor is configured to measure the orientation or tilt of the glove and the input event generator comprises a thumb pad portion and one or more finger contact portions. Contact of the thumb pad portion to one of the finger contact portions generates an input event. A communications module can also be provided for transmitting one or more range measurements, orientation measurements, or input events to an AR system. The glove may also comprise other supporting components such as a power supply, such as battery and/or a microcontroller or microprocessor.

The user input glove maintains the performance of existing interaction techniques of the original Tinmith pinch glove, whilst extending the capabilities and usability. An embodiment was developed by the addition of an orientation (or tilt) sensor in the form of a three axis accelerometer, and a pair of ultrasonic transducers. For convenience the user input glove will also be referred as an ultrasonic glove; however it is to be understood that this is simply one embodiment and other distance measuring sensors or orientation sensors which provide similar functionality may be substituted. The sensors allow capturing of dimensions that are orthogonal to each other and to the ground plane, as many man-made objects are orthogonal in nature. In one embodiment the ultrasonic transducers are mounted in the palm of the gloves and used to detect distance between the palms or from the palms to solid surfaces. The ultrasonic glove enables intuitive body gestures; an everyday example is when a person describes a measurement such as "I caught a fish this big!" and places their hands apart to indicate the size.

The additional capabilities provided by the glove were used to extend the Tinmith modeling User Interface (UI). A set of gestures or interaction methods (or techniques) was developed to map measured orientation and distance measurements to perform such tasks as modeling by measurements and affine transformation of virtual objects. These include fixed and relative translation to change the position of a virtual object by the distance specified by the hands, fixed and relative scaling of a virtual object by adjusting the distance ratio between the hands, and rotation methods to map measured hand distances to degrees. The ultrasonic gloves also support a numeric entry method for wearable AR systems using natural body gestures. The methods supported by the ultrasonic glove only rely on the sensors on the gloves and thus are independent from other sensors in the AR system, thereby reducing sensor errors. The original Tinmith marker-based technique is an example of an action at a distance interaction technique for wearable AR systems. The user input glove and input methods develop offer the first within arm's reach direct manipulation approach to modeling for wearable outdoor AR system.

Figure 2:
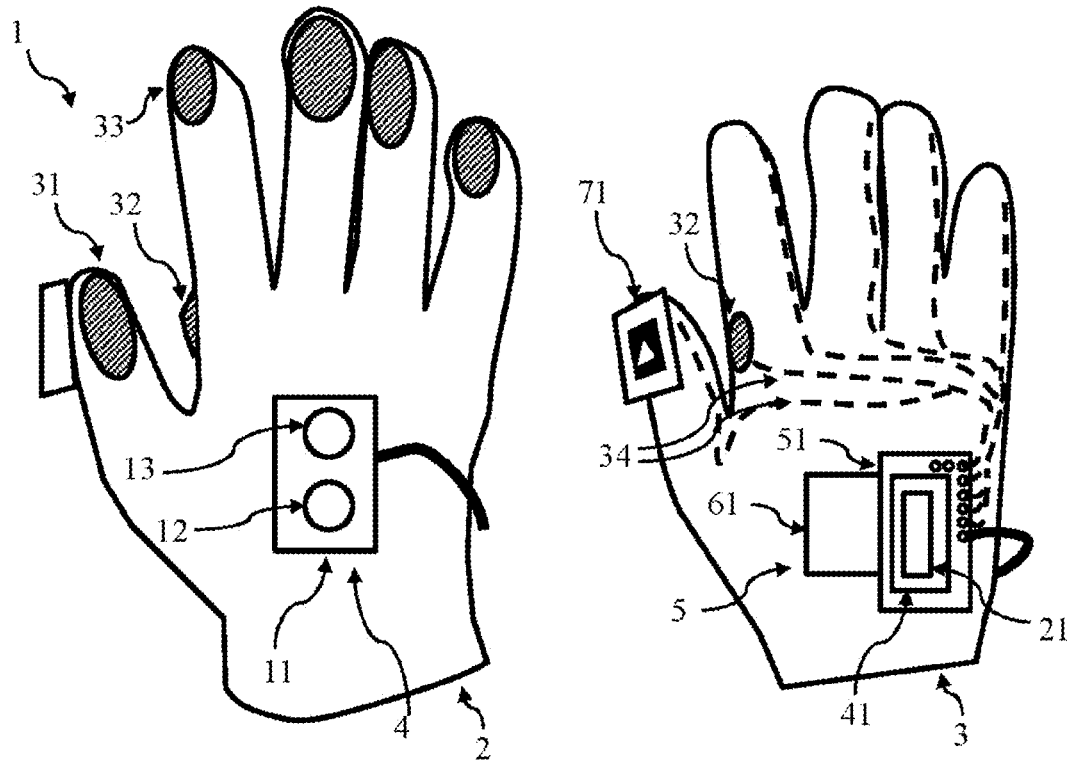
FIG. 2 show front and rear views of an embodiment of a user input glove using ultrasonic sensors.

The front 2 and rear 3 of an embodiment of an ultrasonic glove 1 built from off-the-shelf components is shown in FIG. 2. An Arduino Pro Mini microcontroller board 51, designed by SparkFun Electronics was selected (http://arduino.cc/it/Main/ArduinoBoardProMini). The board has a clock speed of 16 MHz and has a relatively small footprint at 1.77×3.30 cm. However other versions of the Arduino board series or other microcontroller could be used. The Arduino Pro Mini board is connected to a Bluetooth Mate board 41, also made by SparkFun Electronics, to provide a Bluetooth serial connection to a computer and thus the AR system. The Arduino board 51 has both analog and digital pins to support a range of companion boards. Three analog pins are connected to a 3-axis accelerometer breakout board, which is mounted parallel to and on top of the Arduino board.

The Arduino board 51 has several digital pins that can be configured both as input and output. One Arduino's digital pin is wired to a Parallax PING™ ultrasonic board 11 and acts as both an output pin for triggering the ultrasonic pulse and an input pin to read in the pulse width response. There is a pair of ultrasonic transducers 12 13 on the Parallax board that has the distance range of 2 cm to 3 m and measures distances over this range to millimeter accuracy. The Arduino, the Bluetooth Mate 41, and the accelerometer breakout boards 21 are mounted in parallel layers and are attached to the back of a glove 5 (opposite the palm 4). The Parallax ultrasonic board is mounted to the palm of the glove 4. In other embodiments the distance measuring sensor and orientation sensor may be co-located or located in other locations, provided that the distance measuring sensor can either measure or accurately determine (eg using signal processing techniques) distances in the direction orthogonal (or normal) to the palm.

Conductive patches of fabrics are stitched to the thumb pad 31, base of the index finger 32 and finger pads 33 of the glove using conductive threads 34, which run along the fingers towards the back of the glove, where the Arduino board is located. These are used to produce input events. The thread from the thumb is connected to the ground pin on the Arduino board. The threads from the other four fingers 33 and from the patch at the root of the index finger 32 are connected to five digital input pins. The Arduino board has built-in pull up resistors, which set these five digital pins to high. A pinching gesture with the thumb to any of the five finger pads will pull the input to low, which is detected by the Arduino board and triggers an input event. That is contact of the thumb pad portion to one of the finger contact portions completes an electrical circuit which is detected by a monitoring circuit to generate an input event. However the contact portions may be placed in other locations (eg palm) provided they can be brought into contact together. The control board (ie input event generator) can also measure the duration of a contact event. Power is supplied by a power module 61 which includes a rechargeable battery. A fiducial marker 71 is also shown on the rear of the thumb.

Communication with the glove is through a Bluetooth serial port. The Arduino board is configured to receive serial commands to start or stop the accelerometer and the ultrasonic transducers. Once activated, the Arduino board sends back information through the Bluetooth serial port, in the form of "A, x, y, z" (the x, y, z data from the accelerometer) and "R, x" (with x is the range data from the ultrasonic transducers, in cm or mm) The pinch glove data is also sent through in the form of "Pox", with x is the duration in which the pinch gesture is held in microseconds. The use of wireless communications module and power module allows the glove to be independent of the rest of the AR system. However in other embodiments, communications and power could be supplied over a wired connection, such as to a power supply and computer worn by the user in a backpack (or elsewhere) to maintain mobility, or to an independent power supply and computer (ie not worn by the user). Other wireless communication protocols such as RF and IR based protocols (eg ZigBee, IEEE 802.11, IRDA, etc) or wired communication protocols may be used (eg packet based protocols such as TCP/IP or UDP).

The distance sensors are required to provide around cm level accuracy (eg 1, 2 or 3 cm) with sub-cm or even millimeter accuracy preferable over short (eg sub 3 m) distances. An accuracy of about 1 cm (or half inch) was found to be sufficient for most input tasks and reduces uttering and sensor errors. Typically distance sensors have a short blind distance (eg 0-20 cm). Blind distances as large as 20, 30 cm or even 40 cm can be tolerated. A blind distance of less than 10 cm or 5 cm allows the user to measure small distances without having to resort to the use of a scaling factor (also referred to as an amplification factor below). The distance sensor should be able to measure distances out to 2 m-3 m to cover the range two hands can be spaced from each other or the maximum height a hand can reach from the ground. Support for larger distances can also be provided as this facilitates measuring the dimensions of rooms or large objects without having to resort to the use of a scaling or amplification factor. The parallax PING board comprising a pair of ultrasonic transducers was selected as this distance sensor has a compact size allowing them to be because fitted in the palm of the glove, a suitable range from 2 cm to 3 m and millimeter accuracy. The parallax PING is configured such that one of the transducers is a transmitter and the other is a receiver and the system is calibrated to reduce the blind distance from about 20 cm for a single ultrasonic transducer down to 2 cm with the paired transducer system. Other distance sensors may be used such as a single ultrasonic transducer or a laser rangefinder. One alternative ultrasonic transducer is the XL-MaxSonar EZ that has a range from 20 cm to over 7 m (http://www.maxbotix.com/Ultrasonic_Sensors/MB1200.htm). Another alternative is a compact laser rangefinder board manufactured by Parallax (http://www.parallax.com/portals/0/downloads/docs/prod/sens/) which has a slightly larger physical size than the PING parallax board and a larger blind distance of 0-15 cm.

The orientation sensor is used to measure the orientation of the glove. A three axis accelerometer was selected but other tilt or orientation sensors may be selected. In many of the user input methods discussed below, the orientation sensor is only required to provide relatively coarse orientation measurements sufficient to allow determination of the axis and direction along the axis in a predefined orthogonal coordinate system, for example to determine length, width and height of objects. Typically this coordinate system will be defined by a ground plane, which is itself defined by a first and a second axis (eg x and y axes) and a third axis is normal to the ground plane (eg z axis). The ground plane and axes can be configured or defined in a calibration step, in which a user may point the glove in one or more nominal directions (eg parallel to the ground plane to define the third axis, and then a direction within the ground plane to define a first axis from which the second axis can be determined). To reduce processing the three axis measurements may simply be transmitted to the AR system, which determines the orientation of the glove (and performs any quantization to an axis), or the acceleration (or tilt) measurements may be processed by an onboard microprocessor to provide an axial orientation to the AR system. The acceleration (or tilt) measurements may be converted or quantified into one of three different 90 degree orientations, or quantified or binned into other angular intervals such as 1, 5, 10, 30, 45, or 60 degree intervals.

The user input glove, by providing position and orientation measurements, allows the development of a range of gesture based input methods. Whilst ultrasonic transducers and an accelerometer are used in the above embodiment, the distance-based modeling and manipulation methods developed only rely on position and orientation measurements being available, and do not rely on the specific choice of sensors. The sensors may use on board compensation for temperature or other effects. Calibration may be performed as required.

Figure 3A:
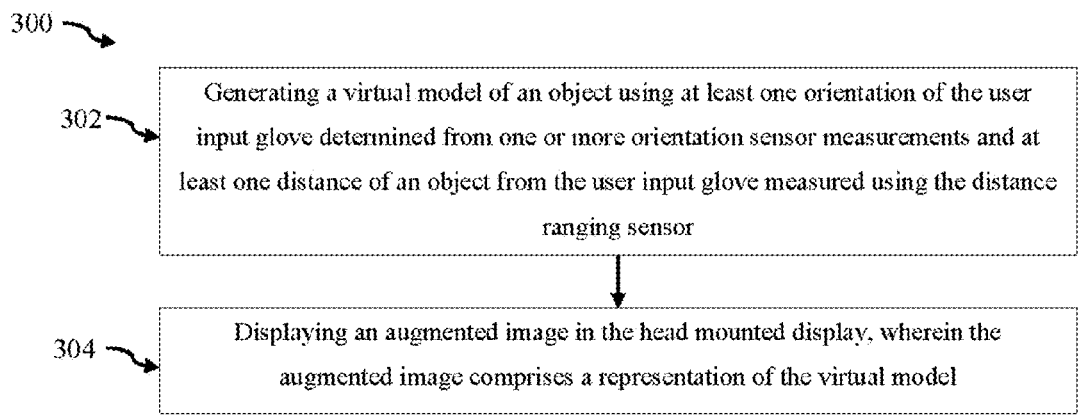
FIG. 3A is a flowchart of a method of providing input in a wearable augmented reality system according to an embodiment.

FIG. 3A is a flowchart of a method 300 of providing input in a augmented reality system which comprises generating a virtual model of an object 302 using at least one orientation of the user input glove determined from one or more orientation sensor measurements and at least one distance of an object from the user input glove measured using the distance ranging sensor and displaying an augmented image in the head mounted display 304, wherein the augmented image comprises a representation of the virtual model. Generation of a virtual model includes both creation of a virtual model as well as manipulation or updating of an existing model (ie generation comprises both creation and updating). The generation (both creation and/or updating) is performed by a computing device (ie processor running AR or other modeling software) using the received measurements. In most cases the same computing device will also generate representations of the virtual model to display using a display device (eg head mounted display in wearable AR, projector in SAR, LCD screen in general computing environment). The computing device may comprise a graphics board and other hardware for supporting the AR or modeling environment. In one embodiment measurement of either an orientation from the orientation sensor or a distance from the distance ranging sensor is performed in response to the user generating an input event. The input event is generated by contacting the thumb pad portion to the contact portion at the base of the adjacent index finger. This provides a natural and relatively fatigue free pinch input method. In this context generating a virtual model comprises generating either a new virtual model, or updating an existing virtual model based upon input from the user input gloves.

The broad input method described in FIG. 3A can be used to perform modeling by measurement. Modeling by measurement is the process of creating virtual models to match the physical dimensions of objects in the world. Traditionally, the process is completed in two stages: measurement and modeling. Physical dimensions are recorded through surveying or manual capture. Desktop-based CAD programs complete the modeling stage by means of numeric input, which allows the user to enter via keyboard the pre-measured dimensions to construct virtual objects. The ultrasonic gloves support contextual AR measurement and modeling as a single process with a simultaneous capturing and modeling stage. Modeling by measurement is integrated into a seamless operation using body and hand gestures. As previously mentioned measurement tasks using body and hand gestures are a natural part of people's daily life: we often extend our arms to illustrate the size of an object (e.g. "I caught a fish this big!"). The placement of the ultrasonic transducers in the palms of the gloves enables these intuitive body and hand gestures for measurements.

Figure 3B:
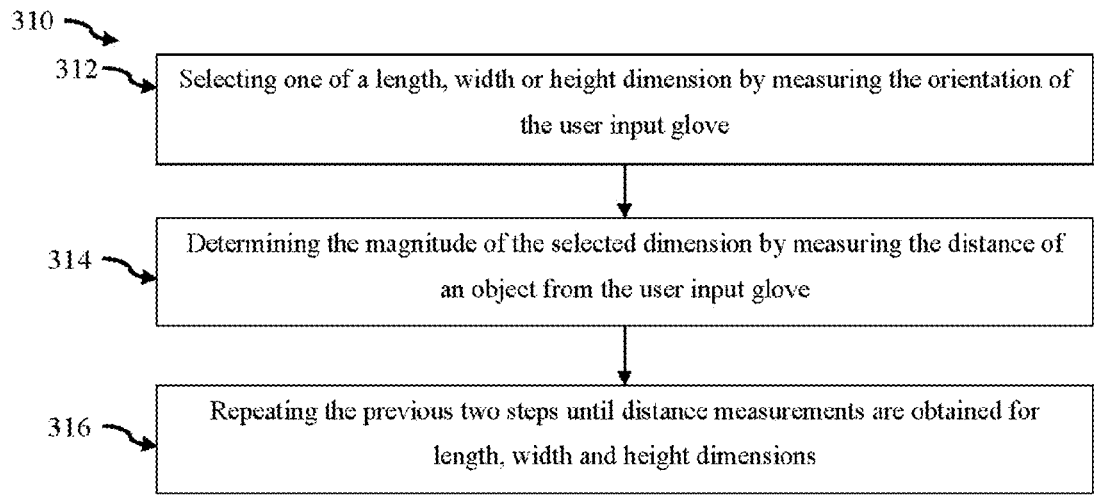
FIG. 3B is a flowchart of a method of determining length, width and height of an object for measuring by modeling according to an embodiment.

In this case the step of generating a model 302 comprises constructing (or creating) a virtual model of a physical object by determining a length, width and height of the physical object. A flow chart of a method for determining the length, width and height 310 is shown in FIG. 3B, and comprises selecting one of a length, width or height dimension by measuring the orientation of the user input glove 312; determining the magnitude of the selected dimension by measuring the distance of an object from the user input glove 314; and repeating the previous two steps (312 314) until distance measurements are obtained for length, width and height dimensions 316.

The modeling by measurement method in this embodiment is a combination of the tilt of the user's hands to determine which dimension will be captured and the distance between the hands. In this embodiment there are three different tilt modes detected by the ultrasonic gloves. The tilt of the fingers parallel to the ground and the normal vector to the palm parallel to the ground places the gloves in the length capture mode. When the fingers are pointing to the ground and the normal vector to the palm parallel to the ground, the gloves are in the width capture mode. Finally, when the normal vector to the palm is pointing towards the ground, the gloves are in the height capture mode. The user is able to capture the dimensions in any order. The user is also able to repeat any dimension measuring operations before the final commit. When wearing the gloves, the user can face the two palms towards each other at a set distance apart, and the ultrasonic transducers then report the distance to the AR system. The distance data is coupled with the dimension defined by the tilt mode of the palm (detected by the accelerometer), to create measurement vectors. These vectors are used to create the width, length, and height of the virtual models. Therefore, the user can create models by capturing the dimensions of physical objects with palm extending gestures. Our ultrasonic glove supports distance based modeling and manipulation techniques employing proprioceptive body gestures, which is an improvement other input devices.

During the modeling by measurement operation, pinching gestures are used to trigger the acquisition of the dimensions. The process (see FIG. 1) is then translated into: "So this filing cabinet is this wide <pinch>, this long <pinch>, and this high <pinch>", which is quicker than the traditional steps of manual measurements: 1) Pull out the tape measure, 2) Read the tape, 3) Replace the tape measure and fetch pen to write down the reading. The trigger pinch gesture is useful in this usage as it can be easily executed while keeping an open palm. The readings of the ultrasonic sensor are sent directly to the AR systems for constructing virtual objects, thus removing the needs for any UI element or widget to be shown to the user. The use of the ultrasonic gloves for modeling for measurement induces little cognitive load, where the user is not mindful of the input device and visual UI elements.

Figures 4A, 4B, 4C:
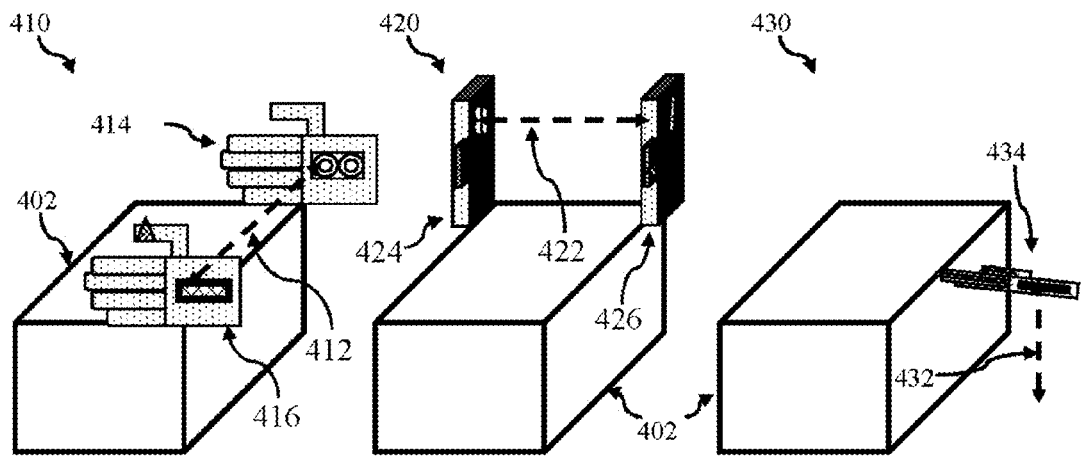
FIG. 4A is schematic diagram of a length measurement of a physical object according to an embodiment.
FIG. 4B is schematic diagram of a width measurement of a physical object according to an embodiment.
FIG. 4C is schematic diagram of a height measurement of a physical object according to an embodiment.

An example task is the modeling of a standing filing cabinet, as illustrated in FIGS. 4A to 4C with three dimensions (in order from left to right: length, width, and height). FIG. 4A illustrates a length measurement 410 of a box 402 representing a filing cabinet. The gloves 414 416 are placed either side of the length dimension and a measurement 412 is made. FIG. 4B illustrates a width measurement 420 of a box 402. The gloves 424 426 are placed either side of the width dimension and a measurement 422 is made. FIG. 4C illustrates a height measurement 430 of a box 402. A glove 414 is placed at the top edge of the box and a height measurement 432 relative to the ground is made. FIGS. 4A to 4C also show the different orientations of the hand when capturing the three dimensions: the palm facing down to capture the height, both palms facing each other horizontally to capture the length, and palms facing vertically for the width. As long as the user keeps the hand in one orientation, the manipulation is performed on the corresponding dimension. To the user, the entire measuring and modeling process seems natural: "So this filing cabinet is this wide, this long, and this high". The user's sense of proprioception allows them to place the palms facing each other without any visual feedback, enabling the effortless usage of both hands to feel the dimensions of the object, with the input device being transparent in the user's mindset.

This method allows creation of the 3D geometry of the physical object. Complex objects can be built up in parts. Textures can be captured and applied through the existing Tinmith system, or from other systems or libraries, and the 3D virtual object may be registered to the physical filing cabinet through affine manipulations. This modeling approach can also be used to capture the dimensions of a physical area, which is delimited by vertical surfaces. Instead of using two palms to measure the distance, the user faces one pair of ultrasonic transducers towards the surfaces to capture the dimensions. This approach is a one-handed operation (similar to the height measurement), which enables the user to use the other hand for pinch glove control.

Figures 4D, 4E:
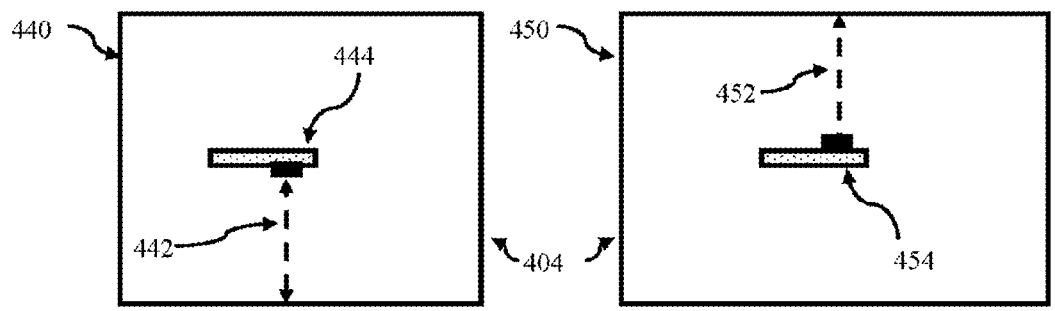
FIG. 4D is schematic diagram of a first height measurement of two part height measurement of a room according to an embodiment.
FIG. 4E is schematic diagram of a second height measurement of two part height measurement of a room according to an embodiment.

A second example of modeling by measurement is the task of capturing the dimensions of a room from within. Standing away from the walls of a room, a user of the ultrasonic gloves can create a virtual model of the room by capturing the three dimensions of width, length, and height; this process is similar to a handheld laser measuring device. FIGS. 4D and 4E illustrate the steps to capture the height of the room. For each of the dimensions, the acquisition procedure involves the user selecting the dimension by assuming the corresponding hand orientation as described in the previous example (palm down for height, horizontal for length, and vertical for width) with the palms facing towards the floor or the one of the walls. The user uses the pinching gesture to capture the distance data, then immediately rotates the palm 180 degrees to face the palm towards the ceiling or the opposite wall and capture the distance data. The sum of the two captured distances will yield the actual dimension of the room. FIG. 4D illustrates the first height measurement 440 and FIG. 4E illustrates the second height measurement 450. In FIG. 4D a first height 442, from the floor to the hand, is measured from a glove 444 in a palm down orientation and in FIG. 5D a second height 452, from the hand to the ceiling, is measured from the glove 454 in a palm up orientation. The entire process can be completed with the user standing at the same spot in the room, as long as there is no obstacle between the user and the walls. The user can also capture the relative distances among the furniture inside the room. Block models of furniture inside the room can be constructed by subtracting the relative distances from the room virtual model, using constructive solid geometry. This approach is useful when the furniture is too big for relative hand distances to use the technique described in the previous example.

The user input gloves can also be used to model the curvature of outdoor buildings. In one method the user of the input gloves faces the palm towards a curved surface at a fixed distance from the body and walks alongside the surface in a straight line. The user walks along a straight line parallel to a chord of the wall. Throughout the walk the ultrasonic transducers (or distance sensors) reports the distance between the user's (palm) and the wall (ie a series of measurements are taken along the line parallel to the chord). For a straight wall, the distance would remain constant; however when the wall is curved, the distance increases or decreases. By capturing the change of the distance data, the curvature of the wall can be estimated or reconstructed. Other variations or measurements are possible. For example the start and end of the chord can be defined as reference points. As the user walks along the chord, the user can periodically stop and take measurements of the distance to the wall, as well as measurements of the distance to the start and end reference points, along with the angle to the start and end reference points (using the orientation sensor). This additional data can then be used to reconstruct the curvature of the wall. Large walls can be measured in parts such as by defining a series of reference points along the wall (rather than just the start and end of the chord).

Figure 3C:
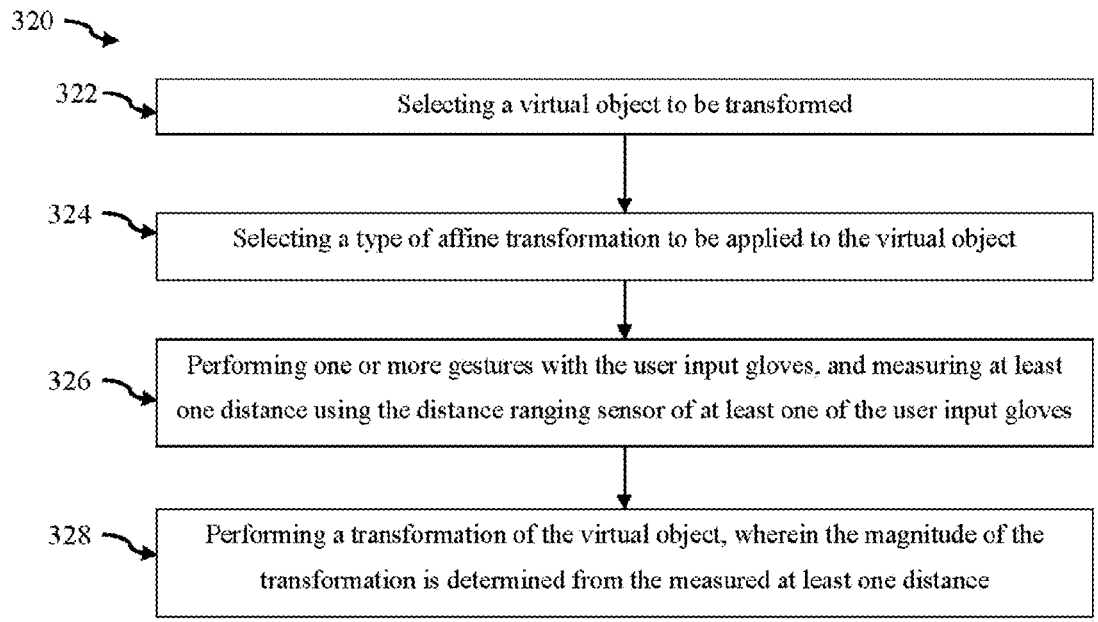
FIG. 3C is a flowchart of a step of generating a model according to an embodiment.

The ultrasonic gloves can also be used as method for performing affine transformations of virtual objects. The affine transformations may include relative scaling, fixed scaling, relative translation, fixed translation, and rotations. These can be used to update existing virtual models so an updated virtual model can be generated, and representations of the generated (updated) virtual model created. FIG. 3C is a flow chart of the step of generating a model, in which the generated model is an affine transformation of a virtual object 320, e.g. to manipulate an object generated by the modeling by measurement method. In this method one of the gloves is defined as a dominant glove and the other glove is defined as the non-dominant glove. Which glove is the dominant user can be selected by the user, such as via a pinch input, or by a gesture or series of gestures.

The step of manipulating a virtual model comprises selecting a virtual object to be transformed 322; selecting a type of affine transformation to be applied to the virtual object 324; performing one or more gestures with the user input gloves, and measuring at least one distance using the distance ranging sensor of at least one of the user input gloves 326; and performing a transformation of the virtual object, wherein the magnitude of the transformation is determined from the measured at least one distance 328.

Using body gestures to describe scaling ratio is common in our daily lives. For example, we often extend the hands at a fixed distance and then double the distance to effectively say "twice as long". We employ this gesture to perform relative scaling operation with the ultrasonic gloves. Upon selection of a virtual object, the user places their palms at a certain distance apart, which is captured as the initial distance. The user then adjusts the distance between the palms to scale the selected object, with a scaling factor that is the ratio between the current palm distance and the initial distance. If the user's intention is to downscale the object, they can set a large initial distance, or a small initial distance for up scaling. The tilt orientation of the palm is used to determine which dimension of the object the user is scaling. If the palm is facing down, for instance, the user is adjusting the height of the virtual object.

Figure 6:
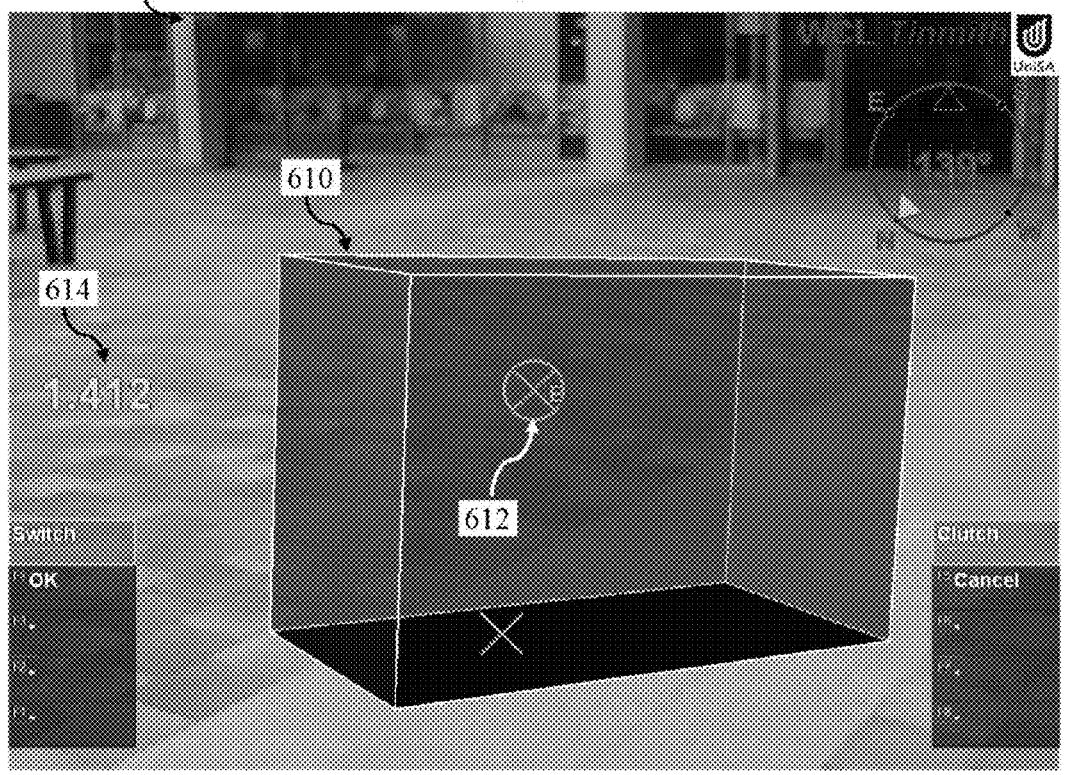
FIG. 6 is an augmented image of a scaling operation according to an embodiment.

Based on experimentation, a UI widget to display the current ratio was added to this technique for the user to achieve a more precise result. The UI widget is a numeric display in the left hand side of the AR view. The UI widget will shift the user's visual attention to the screen and the selected virtual object. The shift of focus leaves the user's proprioception to control the hand distance, which is naturally the main mechanism used to modulate movement distance. FIG. 6 illustrates an augmented image 600 displayed to a user during a relative scaling operation. An eye cursor 612 indicates the center of the image and a virtual box 610 is displayed around the eye cursor. The length dimension is selected and a scaling factor 614 of 1.414 is shown in the left hand side of the view is applied to the length dimension.

A second scaling option, fixed scaling mode, was implemented with the ultrasonic glove. Instead of using the hand distance to control the scaling ratio, fixed scaling adds the specified distance directly to the appropriate dimension of the object. Placing the palms at 40 cm apart, for example, in a horizontal orientation will scale the selected virtual object so that its width will be added exactly 40 cm. There is a pair of ultrasonic transducers on each palm. The additive scaling operation can be completed by the ultrasonic transducers on the dominant palm, and the user is able to switch to the non-dominant palm for subtractive scaling, when the specified distance is subtracted from the current object's dimension. Both additive and subtractive scaling operations are symmetric bimanual interactions, in which movement adjustments are equally divided between both hands. This approach is useful for fine-tuning scaling operation. The UI widget will display the specified distance between the palms, instead of the scaling ratio as in the case of relative scaling.

The ultrasonic gloves support both relative and fixed translation operations, similar to the scaling interaction. Fixed translation moves the object in the object's coordinate axis specified by the tilt orientation of the palm by the exact distance reported by the ultrasonic transducers. Positive translation is performed with the transducers on the dominant palm and translation towards the negative end of the axis is achieved by using the transducers on the non-dominant palm. This can be achieved by the user selecting a sign of a distance measurement from (+1, −1) by selecting a designated user input glove. For example selecting the dominant user input glove selects one sign (eg +1) and selecting the non-dominant user input glove selects the opposite sign (eg −1), or vice versa.

Relative translation adjusts the object's position relative to the user's viewport window. We integrate the ultrasonic relative translation operation with the existing image plane technique in our AR system. The image plane technique uses the eye cursor, which is located at the center of the screen to select object and perform translation by head movement, in a similar way to performing selection of the look-at menu. The integration allows the eye cursor to control the translation of the virtual object in the world coordinate system, while the ultrasonic gloves provide a translational offset in the window coordinate system of the user's viewport. The user starts the operation by selecting the object with the eye cursor and closing their palms together in front of them. As the user extends the distance between the palms horizontally, the selected object is displaced horizontally from the center of the screen. The mapping ratio is selected so that when the palms are at larger than shoulder width apart, the object will be moved to the edge of the screen. In a similar manner, if the user extends the palms vertically, the selected object is moved in the vertical direction. The direction of the movement depends on which palm is actively ranging: if the ultrasonic transducers on the dominant palm is active, the object will be translated to the right or up directions, while the non-dominant palm will move the object towards the left or down directions of the viewport window. In effect the image extends from (−1, 1) in a vertical direction and (−1, 1) in a horizontal direction with the origin in the center and corners of the image at (1, 1), (1,−1), (−1, −1) and (−1, 1).

Rotations can also be performed. In this case the distance between the palms is mapped to rotational degrees for affine rotation of virtual objects. In one embodiment the rotation method comprises determining the dimension to be rotated by measuring an orientation of one of the user input gloves; selecting either the dominant user input glove or the non-dominant user input glove to make a distance measurement; measuring the distance between the two user input gloves, wherein the measured distance is capped at a maximum distance; mapping the measured distance to an angle, wherein the ratio of the measured distance to the maximum distance is multiplied by +90° if the dominant user input glove was selected, or −90° if the non-dominant user input glove was selected; and rotating the virtual model using the mapped angle.

In the ultrasonic glove embodiment described above the ultrasonic sensors can report distances up to millimeter precision. In one embodiment a mapping of 1 cm of distance per 1 degree of rotation was selected, with rotation performed using Euler angles. The minimal distance limited by the hardware is 2 cm and the maximum distance varies on the user's arms' length. It is assumed that most adults can comfortably reach a distance of 90 cm between the hands, which allows for the rotation of the object within one quadrant from 0 to 90 degrees. Alternation to the transducers on the non-dominant hand rotates object in negative direction, from 0 to −90 degrees. The combination of dominant and non-dominant palms provides a range of 180 degrees rotation, from −90 to 90. In order to reach a full 360 degrees rotation, we enable a clutching mechanism through the pinch glove menu, in which the user can pinch to hold the object in its current orientation and immediately apply another rotation on top with the ultrasonic hand gestures. The user is only required to clutch once to reach a full 360 degrees rotation in any axis.

Figure 3D:
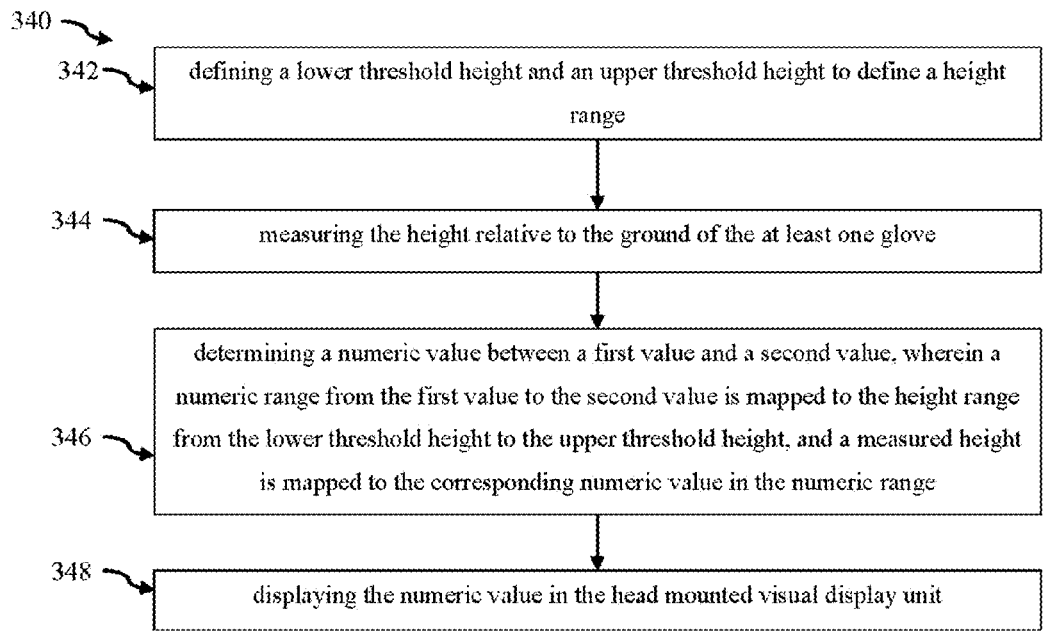
FIG. 3D is a flowchart of a method for obtaining numeric input.

The ultrasonic gloves also allow the development of a method for obtaining numeric input. The ultrasonic numeric entry method supports one-handed ranging operation by using the ground plane when the user adjusts the height of the hand with the palm facing down. The ultrasonic numeric entry method can also enter other numbers through the alternate use of the ultrasonic transducers with both hands. FIG. 3D is a flowchart 340 of an embodiment of such a method. The method comprises defining a lower threshold height and an upper threshold height to define a height range 342; measuring the height relative to the ground of the at least one glove 344; determining a numeric value between a first value and a second value, wherein a numeric range from the first value to the second value is mapped to the height range from the lower threshold height to the upper threshold height, and a measured height is mapped to the corresponding numeric value in the numeric range 346; and displaying the numeric value in the head mounted visual display unit 348.

In one embodiment the first value is 0 and the second value is 9 and mapping the numeric range to the height range comprises dividing the height range into equal height intervals, such that a height measurement in a height interval is assigned a value corresponding to the interval number. This method can be extended to measure a value from 0-99. In this case a pair of user input gloves is used, and the measuring step comprises measuring the height relative to the ground of each glove. The step of determining a numeric value comprises determining a first numeric value between 0 and 9 from the measured height of the dominant hand, and determining a second numeric value between 0 and 9 from the measured height of the non-dominant hand. The resultant numeric value is determined to be in the range between 0 and 99 by multiplying the first numeric value by 10 and adding to the second numeric value. That is the dominant glove is for the tens component and the non-dominant glove is for the units components. The method can be extended for inputting larger numbers. For example the dominant hand could be used for a multiplication factor, such as a factor of 10 multiplier (eg 0.001, 0.01, 0.1, 1, 10, 100, and 1000) and the non-dominant hand used for units. The method can be used as part of other methods, for example to determine an amplification factor for an affine transformation, or to be applied to measured value or object dimension.

Figure 5:
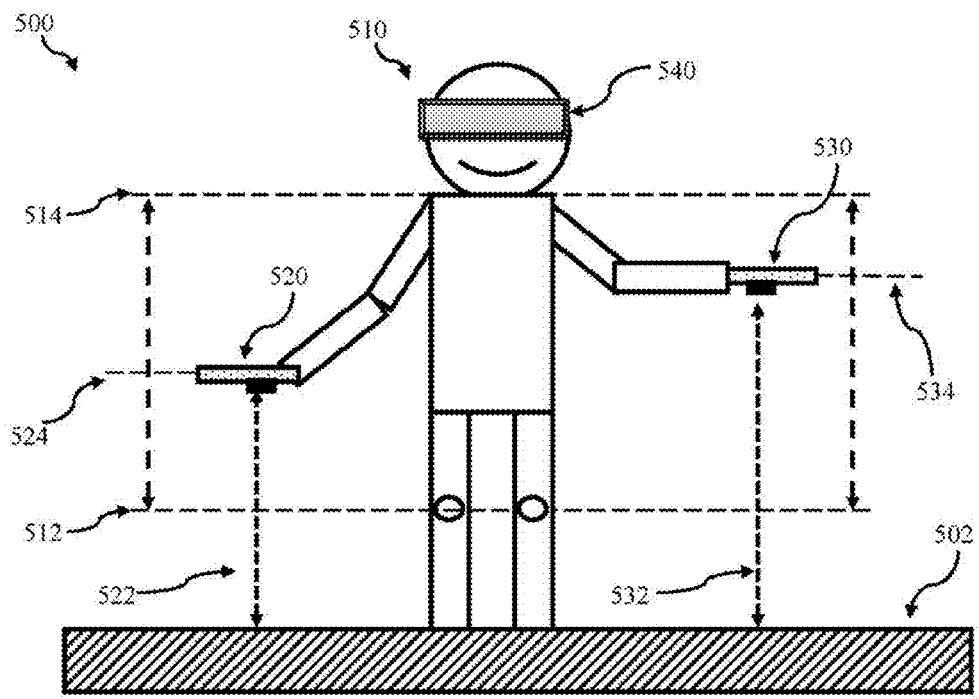
FIG. 5 is a schematic diagram of a numeric entry method according to an embodiment.

FIG. 5 is a schematic representation 500 of a numeric entry method for entering a number between 0 and 99 using a pair of ultrasonic user input glove 520 530. With this digit generation gesture, each hand will provide input mechanism for one digit of a 2-digit number, with the non-dominant hand used for entering the unit digit, and the dominant hand for entering the ten digit. A lower threshold height 512 is defined relative to the ground 502. In one embodiment this is set to 70 cm, which is comfortable low position for most adults to place their hand. Placing the glove at height below 70 cm will be mapped to a zero value. Every 5 cm increase that the user lifts their hand upwards is mapped to the next digit. For example, if the user's hand is within the range of 70 to 75 cm from the ground, the gesture generates the digit 1. Any height larger than (70+5×9=110) cm produces the digit 9. That is the upper threshold height is then defined as 110 cm 514. The values of minimum height (70 cm) and the increase threshold (5 cm) may be changed to suit different individuals. The user 510 selects the height of the dominant glove 520 and a height measurement 522 is made. This height is then mapped to a numeric value 524 using the numeric scale between the minimum and maximum heights. For example a height measurement may be mapped to a value 4, which is then multiplied by 10 to obtain a value 40. The user 510 then selects the height of the non-dominant glove 530 and a height measurement 532 is made. This height is then mapped to a numeric value 534 using the numeric scale between the minimum and maximum heights. For example a height measurement may be mapped to a value 8. A numeric value of 48 is then displayed to the user via the head mounted display 540.

The mapping of a height to a numeric value can be defined in a number of ways to produce the same result. For example as just described the lower threshold height and an interval height can be defined to obtain the upper threshold height. Alternatively the upper threshold height and an interval height can be defined to obtain the lower threshold height. Alternatively the lower and upper threshold heights may be defined, and the interval size determined from these values (eg divide the height range by the number of intervals). The (height) interval size, lower threshold height and upper threshold height can be entered by the user using gestures, in which the user 510 places the glove 520 530 at the threshold heights in turn for the system to record the heights. The mapping can be a linear mapping of heights to values, or some other non-linear mapping may be used, such as log mapping (eg each interval is one log).

Combining both digits from two hands allows the user to set any values from the range of 1 to 99. Larger values can be achieved by allowing the dominant hand (ten digit) to rise higher to reach values of 10 or above. The numeric entry technique is used to set the amplification factor, which is multiplied to the distance specified by the ultrasonic transducers before being applied to the selected manipulation technique. As the amplification factor increases, so does the granularity in precision of the operation. For example, with an amplification factor of 10 for translation task, for every centimeter of hand movement, the object is moved by 10 cm. With the ultrasonic numeric entry technique, the user is able to change the amplification factor to achieve the desired resolution of the interaction technique for various task scenarios.

The interactions supported by the user input gloves fall into the combination of continuous hand actions that are mapped to functions in several task domains. The adjustment of the distances between the hands and/or other solid surfaces is a continuous movement of the hands' position. The distance data may be mapped to perform one of several purposes, as previously described, including modeling by measurements, affine transformations, and a numeric entry technique.

Research studies into input devices have previously defined taxonomy of input device using a matrix combination between the physical properties sensed by the device and the dimensions along which the properties are sensed. In this taxonomy there are two groups of dimensions: linear and rotary along three axes, x, y, and z. The list of physical properties includes position, movement, force, angle, and torque. An input device is represented by a collection of cells within the matrix, corresponding with all the properties and dimensions supported by the device. The cells are connected by three types of composition, namely merge, layout, and connect compositions. Merge composition produces a cross product of two cell domains, while layout expresses collocation of two cells. Connect composition feeds the output of one cell to the input of another. The user input glove input device reports the relative distances, which is considered as sensing the relative linear position of the hands in one dimension. The accelerometer senses angles to determine three separate tilt orientations of the hand. Therefore, our user input glove is represented on the taxonomy as a layout composition of one linear position component and three rotary angle components. In other words, the user input glove is a 4 DOF (degrees of freedom) input device.

The user input glove is a versatile input device that serves several purposes in an AR system, such as wearable AR and SAR systems, including: modeling by measurements for physical objects and internal structures, affine transformation of translation, scaling, and rotation, and numeric entry technique. The user input glove retains all the existing functionality of the original Tinmith glove and complements the existing interaction techniques with distance-based modeling and interaction techniques supported by the distance sensors (such as ultrasonic transducers). By building on the existing glove-based input device, we leverage the intuitiveness and naturalness of the form factor. The hands-free nature of the device is also an advantage, especially for the outdoor settings. The use of a wireless communication module (eg Bluetooth, ZigBee, etc) allows measurements to be transmitted to a computing device which can perform the required processing to generate (both create and update) a virtual model and to display a representation of the virtual model.

Through experience with the original Tinmith pinch glove, the existing marker-based cursor control technique is known to cause fatigue due to the requirement to hold the marker within the view of the camera. The use of gesture based methods using distance and orientation sensors take advantage of proprioception that thus does not require the user to maintain a visual concentration on the input device. Proprioception also allows the user to perform the tasks with natural hand gestures, thus reducing both mental and physical fatigue throughout the operation.

When designing the interaction methods (techniques) for the user input gloves, focus was placed on being independent of other existing sensors in the AR systems, to minimize sensor errors. Tinmith working plane technique projects a virtual ray from the user's marker cursor into the AR world. As the virtual ray intersects with virtual objects, the user moves the onscreen cursor to change the position of the virtual object attached to the ray. The ray position is calculated based on the user position, which is reported by the GPS sensor. Therefore, the working plane technique is prone to errors caused by GPS jitter. The modeling and manipulation methods only rely on the sensors on the gloves and are not disturbed by the errors of any other existing sensors in the current system. For the errors within the sensors on our ultrasonic glove, the exact angular readings of the hand orientations are not mapped to perform the techniques. Instead, use is made of the accelerometer as a tilt sensor to detect three different positions of the hands, which are less prone to sensor jitters and errors (although more accurate measurements could be used if desired).

The user input gloves described, and in particular the ultrasonic glove embodiment allow precise operations to be performed. The ultrasonic transducers can report distance up to millimeter resolution (although centimeter resolution can also be used). By mapping the distance directly to modeling and manipulation tasks, we aim to give the user a familiar sense of real world precision. For the fixed translation and scaling techniques, there is a one-to-one direct mapping from the readings of the ultrasonic gloves to the AR system. The user can directly visualize the exact distance by which the virtual object is translated or scaled by observing the distance between their palms.

The common approach to designing input devices requires an indirect mapping from the input domain of the physical device to the output domain of the application, which are the two tuples in the "sixtuple" definition of input device by Mackinlay et al (J. Mackinlay, S. K. Card, and G. G. Robertson, "A semantic analysis of the design space of input devices," Hum.-Comput. Interact., vol. 5, pp. 145-190, 1990.). Examples include the mapping of the mouse movement on the mouse pad to cursors position on computer screen, or the mapping of knobs, sliders, wheels, etc. to various task domains. Such mappings require an active effort from the user in adapting their mental model of their actions on the input devices to the resulting effects in the AR system. For the user input gloves, distance in natural measurement systems (metric or imperial) is the common currency for the user, the input device, and the AR system. The user performs interaction gestures in natural distances (between the hands and other solid surfaces); the input device reports natural distance; and the AR system directly applies the natural distance to perform various functions. The goal is to provide an interaction mechanism that minimizes the cognitive load during operation. Reducing cognitive efforts as well as lowering fatigue are input design goals when designing successful AR interfaces. The design of the user input gloves aims to achieve these two strategies.

An experiment was designed to compare the ultrasonic modeling techniques to the existing Tinmith marker-based technique. The base task is to create a virtual box-shaped object by capturing the three dimensions of width, length, and height from the physical environment. Three types of modeling tasks were set up: A) modeling an area task, B) physical object task, and C) a shoulder-high object height task. For the area task, we asked the participants to create a virtual 3D rectangular to fit an outdoor area with the dimensions of 1.43 (X)×2.18 (Y)×0.70 (Z) m. For the physical object task, a cardboard box was used (to emulate an outdoor bin) with the dimensions of 0.41 (X)×0.41 (Y)×0.63 (Z) m. For the height task, the participants were asked to capture the height of a branch of a tree at 1.47 m high. The height task was intended to evaluate the body relative nature of the ultrasonic glove. The combination of three modeling tasks (A, B, and C) with two techniques (ultrasonic U, and marker M) created six tasks (UA, UB, UC, MA, MB, and MC). Each participant performed one training iteration and then one data collection iteration (with random order of the six tasks). For each task, the time to complete the task was collected as well as the resulting dimensions of the object. The errors in dimensions are calculated from the measurements of the physical area/objects before the study started. After the six tasks, the participant completed a questionnaire about their preferences for either of the two techniques. The questionnaire asked the participants about how easy it is to understand, how logical the modeling process is, and how intuitive each technique is. The questions were presented in a visual analogue scale, in which the participant indicated with a pen stroke on a continuous line the scale of their responses, from Easy to Hard, Logical to Make no sense, and Intuitive to Complicated, respectively, and the stroke locations were converted to percentages. They were also asked how confident they felt in achieving the goal and their perceived precision of the tasks. The questionnaire also asked the participants to rank their preference between the two techniques, with explanations.

The hypotheses are as follows: H1: The ultrasonic technique is measurably faster in time to complete the task over the marker technique; H2: The ultrasonic technique is measurably more accurate in smaller measurement modeling errors over the marker technique; and H3: The ultrasonic technique has a measurable preference by the participants.

Fourteen participants were recruited, all male, aged 20 to 45 (mean 28.8, SD 7.7). The participants were asked to wear the Tinmith backpack computer to perform modeling tasks using two modeling processes: one using the original marker-based Tinmith technique, and one using the ultrasonic gloves. For the marker-based technique for all three tasks (A, B, and C), the participant is required to step directly to the physical area or object to place a virtual unit cube. The participant moves backward to gain a vantage overview of the modeling area/object, from which they perform scaling operation. The participant holds the thumb marker in front of the head mounted camera. An onscreen cursor is overlaid upon the marker. The participant selects the virtual box with the marker and slides the cursor left and right to adjust the size of the virtual box, one dimension (X, Y, Z) at a time. Switching dimension is enabled with the pinch menu. For the ultrasonic technique, the participant performs modeling by measurement technique as previously described in Section 3.1 with the example of modeling a filing cabinet, for modeling task B of the physical box. For the modeling task A of the outdoor area, the participants faced the ultrasonic glove towards the walls (marked with the red and blue arrows in FIG. 6) and the ground plane to capture the measurements. The outdoor area modeling is an example of modeling tasks with dimensions larger than the participants' arm stretch. For task C, the participants faced the ultrasonic transducers towards the ground and raised their hand to match to the height of an outdoor tree at 1.47 m tall.

A pairwise t-Test was performed between the ultrasonic and the marker techniques for each of the types of modeling tasks (A, B, and C), on the time and error data. Before the study, the dimensions of the physical area and the box were measured. The error data was calculated by the absolute difference between the pre-measurements and the dimensions of the virtual object the participants created. There are three sets of error data for three dimensions. The dimensions were multiplied to create a fourth set of volume error data, which was calculated as the difference between the volumes of the area and the box and the volumes of the virtual object. Overall, a pairwise t-Test was performed on one set of time data, and four sets of error data (volume, X, Y, and Z). The t-Test was first performed on the volume data with an alpha value of $\alpha<0.05$, and three post-hoc t-Tests on the error X, Y, and Z data with a Bonferroni correction with $\alpha<0.0167$. Task C, the height task, required only the Z error data to be analyzed, and an alpha value of $\alpha<0.05$ was employed.

Modeling task A of physical area. There was a significant effect ($p<0.05$) for the time to complete the tasks between the ultrasonic (mean 47.7 s, SD 14.2 s) and the marker (mean 154.1 s, SD 64.5 s) technique to support H1 that the ultrasonic has a measurable advantage in time to complete the task. Additionally the ultrasonic technique displayed a consistent performance across participants, as shown by the lower SD. There was no significant effect ($p=0.06>=0.05$) for the volume error data between the ultrasonic (mean 0.82 m$^3$, SD: 0.69 m$^3$) and the marker (mean: 2.88 m$^3$, SD 4.54 m$^3$). Therefore, H2 was rejected for the volume data. There were significant effects ($p<0.0167$) for the error in the X (depth dimension from the participants' viewpoint) between the ultrasonic (mean 0.45 m, SD 0.37 m) and the marker (mean 0.91 m, SD 0.37 m) techniques that H2 was supported for the depth dimension. There was no significant effect ($p>=0.0167$) for the two (Y and Z) error data; therefore, H2 is rejected in these dimensions.

Modeling task B of physical object. There was a significant effect ($p<0.05$) for the time to complete the task between the ultrasonic (mean 40.8 s, SD 16.8 s) and the marker (mean 98.4 s, SD 71.3 s) to support H1. Once again the mean time for completion is much more consistent when the ultrasonic gloves are employed. There was a significant effect ($p<0.05$) for the volume error data between the ultrasonic (mean 0.06 m$^3$, SD 0.07 m$^3$) and the marker (mean 1.39 m$^3$, SD 2.09 m$^3$) techniques to support H2. There were significant effects ($p<0.0167$) for the three dimensions (X, Y, and Z) error data between the ultrasonic and the marker techniques. Tables 1, 2 and 3 provide a summary for mean and SD values the different dimension data. We can state that H2 was fully supported in all three dimensions.

TABLE 1

Time comparison for tasks between ultrasonic and marker in the user evaluation study.

| | Time (seconds) | | | | | |
|---|---|---|---|---|---|---|
| | Virtual | | Actual | | Height | |
| | Mean | SD | Mean | SD | Mean | SD |
| Ultrasonic | 47.73 | 14.20 | 40.87 | 16.80 | 17.38 | 6.60 |
| Marker | 154.09 | 64.50 | 98.45 | 71.40 | 65.16 | 40.80 |

TABLE 2

X, Y and Z dimension errors for tasks between ultrasonic and marker in the user evaluation study

| | ErrorX (m) | | | | ErrorY (m) | | | | ErrorZ (m) | | | |
|---|---|---|---|---|---|---|---|---|---|---|---|---|
| | Virtual | | Actual | | Virtual | | Actual | | Virtual | | Actual | |
| | Mean | SD | Mean | SD | Mean | SD | Mean | SD | Mean | SD | Mean | SD |
| Ultrasonic | 0.46 | 0.37 | 0.06 | 0.10 | 0.39 | 0.42 | 0.18 | 0.24 | 0.24 | 0.20 | 0.11 | 0.10 |
| Marker | 0.92 | 0.37 | 0.74 | 0.53 | 0.50 | 0.33 | 0.60 | 0.55 | 0.46 | 0.51 | 0.39 | 0.24 |

TABLE 3

Z Height Error and Volume Errors for tasks between ultrasonic and marker in the user evaluation study

| | ErrorZ (m) | | Volume errors (m$^3$) | | | | | |
|---|---|---|---|---|---|---|---|---|
| | Height | | Virtual | | Actual | | Height | |
| | Mean | SD | Mean | SD | Mean | SD | Mean | SD |
| Ultrasonic | 0.16 | 0.26 | 0.82 | 0.69 | 0.06 | 0.08 | 0.14 | 0.21 |
| Marker | 0.50 | 0.91 | 2.88 | 4.54 | 1.39 | 2.08 | 0.60 | 0.87 |

Modeling task C of height There was a significant effect ($p<0.05$) for the time to complete the task between the ultrasonic (mean 17.3 s, SD 6.5 s) and the marker (mean 65.1 s, SD 40.7 s) techniques to support H1. There was no significant effect for the error in Z dimension between the ultrasonic (mean 0.16 m, SD 0.26) and the marker (mean 0.5 m, SD 0.91 m) techniques for these tasks. Therefore, H2 was rejected.

Figure 7:
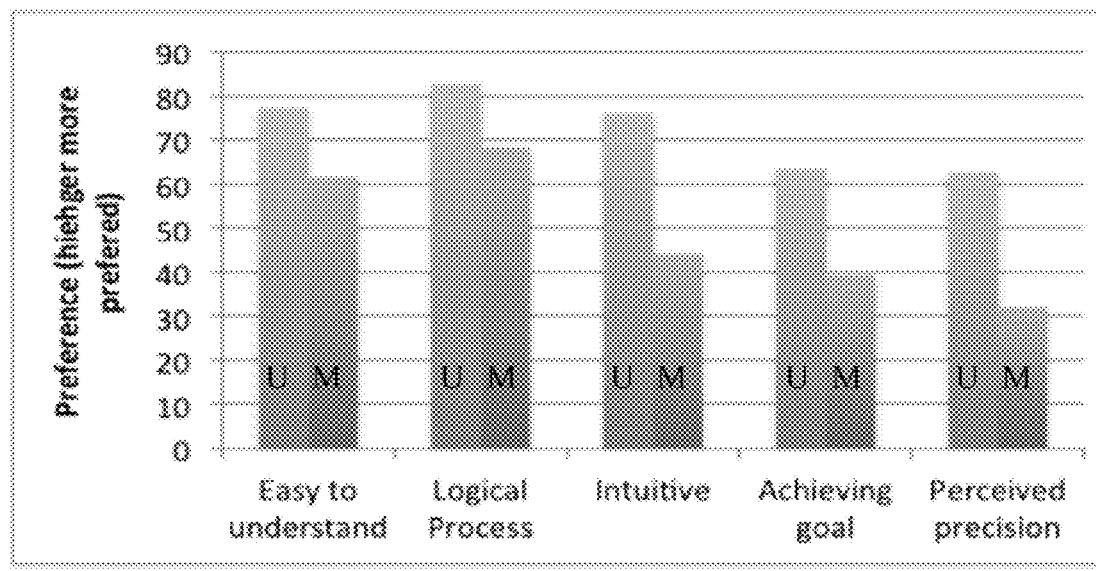
FIG. 7 is a bar chart of average responses to a questionnaire of participants in an evaluation trial.

The responses to the questionnaire were converted into percentages, averaged and presented in a bar chart shown in FIG. 7, which shows the average preference for each question for Ultrasonic glove input (U) and marker input (M). A pairwise t-Test was performed on the percentage values between the ultrasonic and the marker techniques for each of the question. There were significant effects ($p<0.05$) across all questions that the ultrasonic technique supports an easier to understand and more logical modeling process, as well as being more intuitive to use, with higher perceived precision and task completion. When asked to rank the two techniques, 100% of the participants ranked the ultrasonic technique over the marker-based technique. The reasons ranged from "being more comfortable", "more stable (than the GPS error experienced by the marker)", and "more intuitive". The analysis of the questionnaire supported H3 that the ultrasonic has a measurable preference by the participants.

The evaluation performed demonstrates that the ultrasonic techniques offer several advantages over the existing marker-based technique for modeling. One of the main advantages is the time to complete the task. As can be seen from the study results, the ultrasonic techniques reduce the overall time up to four times as compared to the marker-based technique. The result is an indication of the difference in the nature of the two techniques: the marker-based technique is based on the action at a distance, while the ultrasonic technique employs a direct manipulation approach.

During the modeling study, it was noticed that the participants had difficulty modeling the physical box with the marker technique. It is believe that a contributing factor was caused by the virtual model, albeit being semi-transparent, obscuring the physical box during the modeling process. The obscuration reduced the participants' ability to match up the edges of the virtual model with those of the physical box. This observation explained the measurable effects in all dimensions between the ultrasonic and the marker techniques. The outdoor area did not suffer from such phenomenon. The edges of the outdoor area were defined by the walls and a bench, which are not obscured by the virtual model that the participants' were manipulating. Therefore, there was only a significant effect in one of the dimension in the result analysis. The dimension that showed significant difference is the dimension of the virtual object that is parallel to the normal axis of the user's image plane.

Embodiments of the user input gloves described herein can be used to measure the natural range of distances that hands can be placed, as well as their orientations with sufficient resolution to facilitate a range of gesture based input methods to be developed and utilized. Embodiments using ultrasonic transducers, accelerometers, pinch inputs (including an input at the base of the index finger) and a wireless communication module were light weight, easy to use and reduced fatigue. The evaluations indicate that the ultrasonic glove is a versatile input device that supports distance-based modeling. The modeling by measurement methods offer an improvement over the existing marker-based modeling technique for outdoor AR, both in time to complete the task as well as modeling errors. The ultrasonic glove also supports manipulation methods, with equivalent performances to the existing marker-based technique. Moreover, the distance-based modeling and interaction methods can be generalized to different sensor technologies, be used indoors or outdoors, or used alongside other systems such as the OptiTrack system, or a Kinect system, which accommodate for the future advancement of sensor technologies. The user input gloves operate mainly within the personal area surrounding the users and are most naturally suitable for body sized objects. There is an upper limit to the specified distance imposed by the user's arm length when using both hands, but single handed measurements can take advantage of longer ranges of the distance measuring sensors to measure distances to other objects. Models of large objects such as outdoor buildings can be generated and manipulated through the use of a numeric input technique to obtain an amplification factor to magnify the effective distances measured. The user input gloves and input methods developed provide an improved input device and methods particularly suitable for use in wearable AR systems. However the versatility and ease of use allow the use of the gloves and methods for other AR systems such as SAR, or even to create and manipulate virtual models in general computing devices and environments.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer or processor readable medium such as a RAM memory, flash memory, ROM memory, EPROM memory, registers, hard disk, a removable disk, a CD-ROM, a DVD-ROM or any other form of non-transitory computer or processor readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Figure 8:
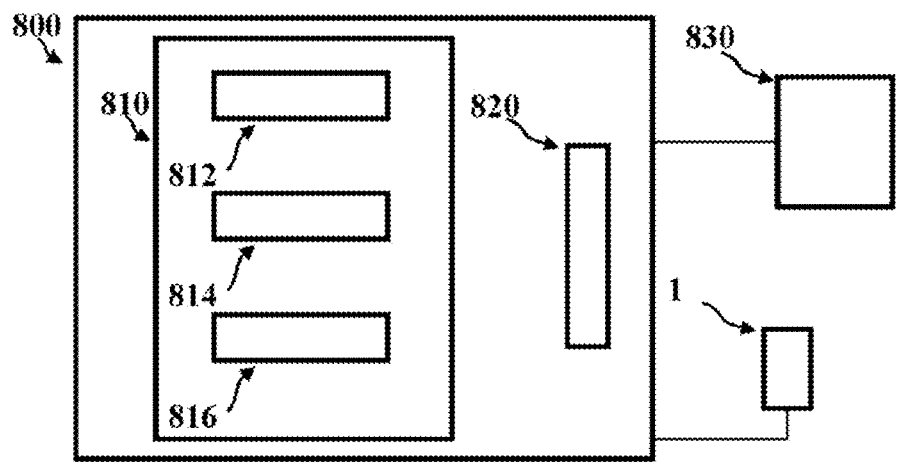
FIG. 8 is a block diagram of a computing system according to an embodiment.

The computing device may be a single computing or programmable device, or a distributed device comprising several devices or components operatively connected via wired or wireless connections. The computing device 800 as illustrated in FIG. 8 comprising a central processing unit (CPU) 810, a memory 820, a display apparatus 830, and at least one user input glove 1. The CPU 810 may comprise an Input/Output Interface 812, an Arithmetic and Logic Unit (ALU) 814 and a Control Unit and Program Counter element 816 which is in communication with input and output devices (eg user input gloves 1 and display apparatus 820) through the Input/Output Interface. The Input/Output Interface may comprise a network interface and/or communications module for communicating with an equivalent communications module in a user input glove using a predefined communications protocol (e.g. Bluetooth, Zigbee, IEEE 802.15, IEEE 802.11, TCP/IP, UDP, etc). A graphical processing unit (GPU) may also be included. The computing device may comprise a single CPU (core) or multiple CPU's (multiple core). The computing device may use a parallel processor, a vector processor, or be a distributed device. The memory is operatively coupled to the processor(s) and may comprise RAM and ROM components, and may be provided within or external to the device. The memory may be used to store the operating system and additional software modules that can be loaded and executed by the processor(s). The memory may run or execute software to support Augmented Reality systems, including wearable AR and spatial AR systems, or to support modeling of virtual objects using input received via user input glove 1.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

What is claimed is:

1. A method for providing input in an augmented reality (AR) system comprising at least one user input glove comprising a distance ranging sensor, an orientation sensor, and an input event generator, and a display apparatus, the method comprising:
    generating a virtual model of an object using at least one orientation of the user input glove determined from one or more orientation sensor measurements and at least one distance of an object from the user input glove measured using the distance ranging sensor; and
    displaying a representation of the virtual model,
    wherein the input event generator comprises a thumb pad portion and a contact portion at the base of the adjacent index finger, and measurement of either an orientation from the orientation sensor or a distance from the distance ranging sensor is performed in response to the user generating an input event by contacting the thumb pad portion to the contact portion.

2. A method as claimed in claim 1, wherein the AR system is a wearable AR system further comprising a head mounted camera, and the display apparatus is a head mounted visual display unit, and the step of displaying a representation of the virtual model comprises displaying an augmented image from the camera in the head mounted display wherein the augmented image comprises a representation of the virtual model.

3. A method as claimed in claim 1, wherein AR system is a spatial AR system in which the display apparatus is one or more projectors and the step of displaying a representation of the virtual model comprises projecting one or more representations of the virtual model onto one or more surfaces.

4. The method as claimed in claim 1, wherein a measured distance is displayed to the user.

5. A method for providing input in an augmented reality (AR) system comprising at least one user input glove comprising a distance ranging sensor, an orientation sensor, and an input event generator, and a display apparatus, the method comprising:
    generating a virtual model of an object using at least one orientation of the user input glove determined from one or more orientation sensor measurements and at least one distance of an object from the user input glove measured using the distance ranging sensor, wherein the step of generating a virtual model comprises constructing a virtual model of a physical object by determining a length, width and height of the physical object, and determining the length, width and height comprises:
    selecting one of a length, width or height dimension by measuring the orientation of the user input glove;
    determining the magnitude of the selected dimension by measuring the distance of an object from the user input glove; and
    repeating the previous two steps until distance measurements are obtained for length, width and height dimensions; and
    displaying a representation of the virtual model.

6. The method as claimed in claim 5, wherein the length dimension is selected when the measured orientation corresponds to an orientation in which the fingers are pointed in a direction parallel to a ground plane and a normal vector to the palm is also parallel to the ground plane.

7. The method as claimed in claim 5, wherein the width dimension is selected when the measured orientation corresponds to an orientation in which the fingers are pointed at a ground plane and a normal vector to the palm is parallel to the ground plane.

8. The method as claimed in claim 5, wherein the height dimension is selected when the measured orientation corresponds to an orientation in which the fingers are pointed in a direction parallel to a ground plane and a normal vector to the palm is pointed at the ground plane.

9. The method as claimed in claim 5, wherein the distance ranging sensor measures the distance between the user input glove and the other hand of the user.

10. The method as claimed in claim 5, wherein the distance ranging sensor measures the distance between the user input glove and a surface of the physical object.

11. The method as claimed in claim 5, wherein the step of determining the magnitude of the selected dimension comprises making a plurality of distance measurements, and combining the plurality of distance measurements.

12. The method as claimed in claim 5, wherein the AR system is a wearable AR system further comprising a head mounted camera, and the display apparatus is a head mounted visual display unit, and the step of displaying a representation of the virtual model comprises displaying an augmented image from the camera in the head mounted display wherein the augmented image comprises a representation of the virtual model.

13. The method as claimed in claim 5, wherein AR system is a spatial AR system in which the display apparatus is one or more projectors and the step of displaying a representation of the virtual model comprises projecting one or more representations of the virtual model onto one or more surfaces.

14. The method as claimed in claim 5, wherein a measured distance is displayed to the user.

15. A method for providing input in an augmented reality (AR) system comprising at least one user input glove comprising a distance ranging sensor, an orientation sensor, and an input event generator, and a display apparatus, the method comprising:

generating a virtual model of an object using at least one orientation of the user input glove determined from one or more orientation sensor measurements and at least one distance of an object from the user input glove measured using the distance ranging sensor; and measuring an amplification factor for a distance measurement, and wherein the at least one input glove comprises a pair of input gloves and one of the input gloves is a dominant input glove and the other input glove is a non-dominant input glove, and the magnitude of llthell a selected dimension is determined by multiplying the measured distance by the amplification factor, and measuring the amplification factor comprises:

measuring the height relative to the ground of the dominant glove and the height relative to the ground of the non-dominant glove; and determining an amplification factor between 0 and 99, wherein the tens value is determined by quantizing the measured height of the dominant glove to a value between 0 and 9, and the units value is determined by quantizing the measured height of the non-dominant glove to a value between 0 and 9 displaying a representation of the virtual model.

16. The method as claimed in claim 15, wherein the AR system is a wearable AR system further comprising a head mounted camera, and the display apparatus is a head mounted visual display unit, and the step of displaying a representation of the virtual model comprises displaying an augmented image from the camera in the head mounted display wherein the augmented image comprises a representation of the virtual model.

17. The method as claimed in claim 15, wherein AR system is a spatial AR system in which the display apparatus is one or more projectors and the step of displaying a representation of the virtual model comprises projecting one or more representations of the virtual model onto one or more surfaces.

18. The method as claimed in claim 15, wherein a measured distance is displayed to the user.

19. A method for obtaining numeric input in a wearable augmented reality system comprising at least one user input glove comprising a distance ranging sensor, an orientation sensor, and an input event generator, and a display apparatus, the method comprising:

defining a lower threshold height and an upper threshold height to define a height range;

measuring the height relative to the ground of the at least one glove;

determining a numeric value between a first value and a second value, wherein a numeric range from the first value to the second value is mapped to the height range from the lower threshold height to the upper threshold height, and a measured height is mapped to the corresponding numeric value in the numeric range; and displaying the numeric value.

20. The method as claimed in claim 19, wherein the first value is 0 and the second value is 9 and mapping the numeric range to the height range comprises dividing the height range into equal height intervals, such that a height measurement in a height interval is assigned a value corresponding to the interval number.

21. The method as claimed in claim 20, wherein the at least one user input glove comprises a pair of user input gloves, and the measuring step comprises measuring the height relative to the ground of each glove and the step of determining a numeric value comprises determining a first numeric value between 0 and 9 from the measured height of the dominant hand, and determining a second numeric value between 0 and 9 from the measured height of the non-dominant hand, and determining a numeric value in the range between 0 and 99 by multiplying the first numeric value by 10 and adding to the second numeric value.

22. The method as claimed in claim 19, wherein the AR system is a wearable AR system comprising a head mounted camera and the display apparatus is a head mounted visual display unit for displaying an augmented image from the camera, the augmented image comprising the numeric value.

23. A computing system comprising:

at least one user input glove comprising:

a distance ranging sensor configured to measure the distance to an object from the glove in a direction normal to the palm of the glove;

an orientation sensor for measuring the orientation of the glove;

an input event generator comprising a thumb pad portion and one or more finger contact portions, wherein contact of the thumb pad portion to one of the finger contact portions generates an input event; and a communication module for transmitting one or more range measurements, orientation measurements, or input events a display apparatus; and a processor and a memory, wherein the computing system is an augmented reality (AR) system and the memory comprises processor readable instructions for causing the processor to generate a virtual model of an object using input from one or more of the pair of user input gloves, and the display apparatus is configured to display a representation of the virtual model, and wherein the memory further comprises processor readable instructions for generating a virtual model by constructing a virtual model of a physical object by determining a length, width and height of the physical object using the user input glove, and determining the length, width and height comprises:

selecting one of a length, width or height dimension by measuring the orientation of the user input glove using the orientation sensor;

determining the magnitude of the selected dimension by measuring the distance of an object from the user input glove using the distance ranging sensor; and repeating the previous two steps until distance measurements are obtained for length, width and height dimensions.

24. The computing system as claimed in claim 23, wherein the AR system is a wearable AR system and the display apparatus is a head mounted camera and visual display unit for displaying an augmented image from the camera.

25. The computing system as claimed in claim 23, wherein the AR system is a spatial AR system and the display apparatus is one or more projectors for projecting one or more representation of the virtual model onto one or more surfaces.

26. The computing system as claimed in claim 23, wherein the distance ranging sensor measures distances in the range between 5 cm and 2 m to an accuracy of approximately 1cm or less.

27. The computing system as claimed in claim 23, wherein the ranging sensor is one or more ultrasonic transducers.

28. The computing system as claimed in claim 27, wherein the one or more ultrasonic transducers is a pair of ultrasonic transducers.

29. The computing system as claimed in claim 23, wherein the orientation sensor measurements are processed to determine the orientation of the glove in a direction along an axis of a predefined coordinate system comprising three orthogonal axes, wherein a first and a second axis define a ground plane and a third axis is normal to the ground plane.

30. The computing system as claimed in claim 23, wherein the orientation sensor is a three axis accelerometer.

31. The computing system as claimed in claim 23, wherein the distance ranging sensor is located in the palm of the glove, the orientation sensor is located on the back of the hand.

32. The computing system as claimed in claim 23, wherein the one or more finger contact portions comprises a contact portion at the base of the index finger adjacent the thumb.

33. The computing system as claimed in claim 23, wherein the thumb pad portion and the one or more finger contact portions are patches of conductive fabric, and contact of the thumb pad portion to one of the finger contact portions completes an electrical circuit which is detected by a monitoring circuit to generate an input event.

34. The computing system as claimed in claim 23, wherein the input event generator measures the duration of a contact event.

35. The computing system as claimed in claim 23, wherein the communication module comprises a wireless communications module.

36. A computing system comprising:
a pair of user input gloves, each user input glove comprising:
a distance ranging sensor configured to measure the distance to an object from the glove in a direction normal to the palm of the glove;
an orientation sensor for measuring the orientation of the glove;
an input event generator comprising a thumb pad portion and one or more finger contact portions, wherein contact of the thumb pad portion to one of the finger contact portions generates an input event; and
a communication module for transmitting one or more range measurements, orientation measurements, or input events
a display apparatus; and
a processor and a memory,
wherein the computing system is an augmented reality (AR) system and the memory comprises processor readable instructions for causing the processor to generate a virtual model of an object using input from one or more of the pair of user input gloves, and the display apparatus is configured to display a representation of the virtual model, and
wherein the memory comprises further instructions for causing the processor to measure an amplification factor for a distance measurement, and wherein one of the input gloves is a dominant input glove and the other input glove is a non-dominant input glove, and the magnitude of the selected dimension is determined by multiplying a measured distance using the distance ranging sensor by the amplification factor, and measuring the amplification factor comprises:
measuring the height relative to the ground of the dominant glove and the height relative to the ground of the non-dominant glove; and
determining an amplification factor between 0 and 99, wherein the tens value is determined by quantizing the measured height of the dominant glove to a value between 0 and 9, and the units value is determined by quantizing the measured height of the non-dominant glove to a value between 0 and 9.

37. The computing system as claimed in claim 36, wherein the AR system is a wearable AR system and the display apparatus is a head mounted camera and visual display unit for displaying an augmented image from the camera.

38. The computing system as claimed in claim 36, wherein the AR system is a spatial AR system and the display apparatus is one or more projectors for projecting one or more representation of the virtual model onto one or more surfaces.

39. The computing system as claimed in claim 36, wherein the distance ranging sensor measures distances in the range between 5 cm and 2 m to an accuracy of approximately 1cm or less.

40. The computing system as claimed in claim 36, wherein the ranging sensor is one or more ultrasonic transducers.

41. The computing system as claimed in claim 40, wherein the one or more ultrasonic transducers is a pair of ultrasonic transducers.

42. The computing system as claimed in claim 36, wherein the orientation sensor measurements are processed to determine the orientation of the glove in a direction along an axis of a predefined coordinate system comprising three orthogonal axes, wherein a first and a second axis define a ground plane and a third axis is normal to the ground plane.

43. The computing system as claimed in claim 36, wherein the orientation sensor is a three axis accelerometer.

44. The computing system as claimed in claim 36, wherein the distance ranging sensor is located in the palm of the glove, the orientation sensor is located on the back of the hand.

45. The computing system as claimed in claim 36, wherein the one or more finger contact portions comprises a contact portion at the base of the index finger adjacent the thumb.

46. The computing system as claimed in claim 36, wherein the thumb pad portion and the one or more finger contact portions are patches of conductive fabric, and contact of the thumb pad portion to one of the finger contact portions completes an electrical circuit which is detected by a monitoring circuit to generate an input event.

47. The computing system as claimed in claim 36, wherein the input event generator measures the duration of a contact event.

48. The computing system as claimed in claim 36, wherein the communication module comprises a wireless communications module.

49. A non-transitory processor readable medium, comprising instructions for causing a processor to provide input in an augmented reality (AR) system comprising at least one user input gloves comprising a distance ranging sensor, an orientation sensor, and an input event generator, and a display apparatus, the memory comprising instructions for:
generating a virtual model of an object using at least one orientation of the user input glove determined from one or more orientation sensor measurements and at least one distance of an object from the user input glove measured using the distance ranging sensor, wherein the step of generating a virtual model comprises constructing a virtual model of a physical object by determining a length, width and height of the physical object, and determining the length, width and height comprises:

selecting one of a length, width or height dimension by measuring the orientation of the user input glove;

determining the magnitude of the selected dimension by measuring the distance of an object from the user input glove; and repeating the previous two steps until distance measurements are obtained for length, width and height dimensions; and displaying a representation of the virtual model.

50. A non-transitory processor readable medium, comprising instructions for obtaining numeric input in a wearable augmented reality system comprising at least one user input glove comprising a distance ranging sensor, an orientation sensor, and an input event generator, and a display apparatus, the memory comprising instructions for:

defining a lower threshold height and an upper threshold height to define a height range;

measuring the height relative to the ground of the at least one glove;

determining a numeric value between a first value and a second value, wherein a numeric range from the first value to the second value is mapped to the height range from the lower threshold height to the upper threshold height, and a measured height is mapped to the corresponding numeric value in the numeric range; and displaying the numeric value.

* * * * *